(12) United States Patent
McCavit et al.

(10) Patent No.: US 8,853,952 B2
(45) Date of Patent: Oct. 7, 2014

(54) LIGHT LEVEL AND LIGHT LEVEL RATE OF CHANGE SENSOR

(75) Inventors: Kim I. McCavit, St. Joseph, MI (US); Roger D. Bentley, Coloma, MI (US)

(73) Assignee: Jenesis International Incorporated, Benton Harbor, MI (US)

( * ) Notice: Subject to any disclaimer, the term of this patent is extended or adjusted under 35 U.S.C. 154(b) by 101 days.

(21) Appl. No.: 13/313,263

(22) Filed: Dec. 7, 2011

(65) Prior Publication Data

US 2013/0147368 A1    Jun. 13, 2013

(51) Int. Cl.
*H05B 37/02*    (2006.01)

(52) U.S. Cl.
USPC ............ 315/159; 315/152; 315/158; 315/291

(58) Field of Classification Search
USPC ......... 315/149, 152–154, 156, 158, 159, 291, 315/307, 308, 313, 362
See application file for complete search history.

(56) References Cited

U.S. PATENT DOCUMENTS

| | | | |
|---|---|---|---|
| 6,396,040 B1 | 5/2002 | Hill | |
| 7,253,570 B2 * | 8/2007 | Ayres | 315/308 |
| 7,297,929 B2 | 11/2007 | Cernasov et al. | |
| 7,635,958 B2 * | 12/2009 | Miki | 315/312 |
| 8,373,355 B2 * | 2/2013 | Hoover | 315/291 |
| 2004/0051466 A1 * | 3/2004 | Liu | 315/149 |
| 2010/0182773 A1 | 7/2010 | Wells | |
| 2011/0221350 A1 | 9/2011 | Staab | |

OTHER PUBLICATIONS

Bright Image Corporation, Automatic Closet Light, 2010, http://www.touchandglow.com/product-p/ezt-acl.htm.
General Electric, LED Motion Sensing Light Model #17437, http://www.amazon.com/17437-Motion-Sensing-Light-Battery/dp/B001RIYL9K/ref=sr_1_2?ie=UTF8&qid=1323109880&sr=8-2.

* cited by examiner

*Primary Examiner* — James H Cho
(74) *Attorney, Agent, or Firm* — George Pappas

(57) ABSTRACT

An optical sensor controlled lighting system comprises an ambient light sensor responsive to ambient light levels for generating an output signal proportional to the ambient light level. A light source having on and off states is controlled by circuit elements providing for developing a rate of change for the output signal and further providing for, responsive to the rate of change, selectively switching the light source between on and off states based on characteristics of the rate of change.

13 Claims, 14 Drawing Sheets

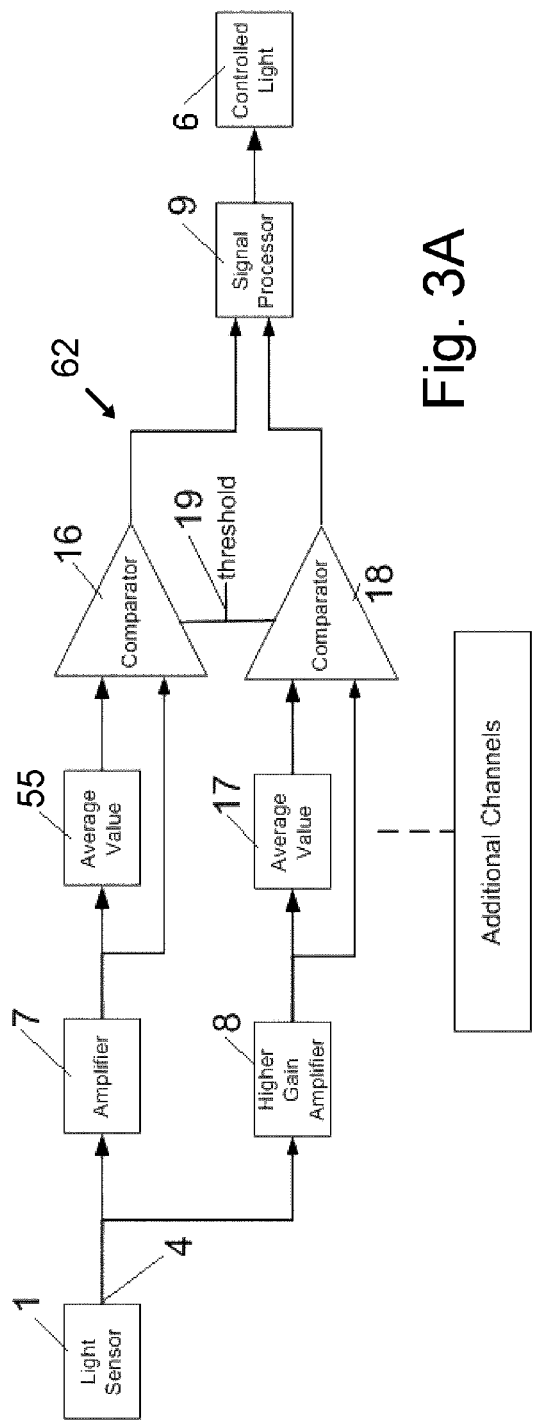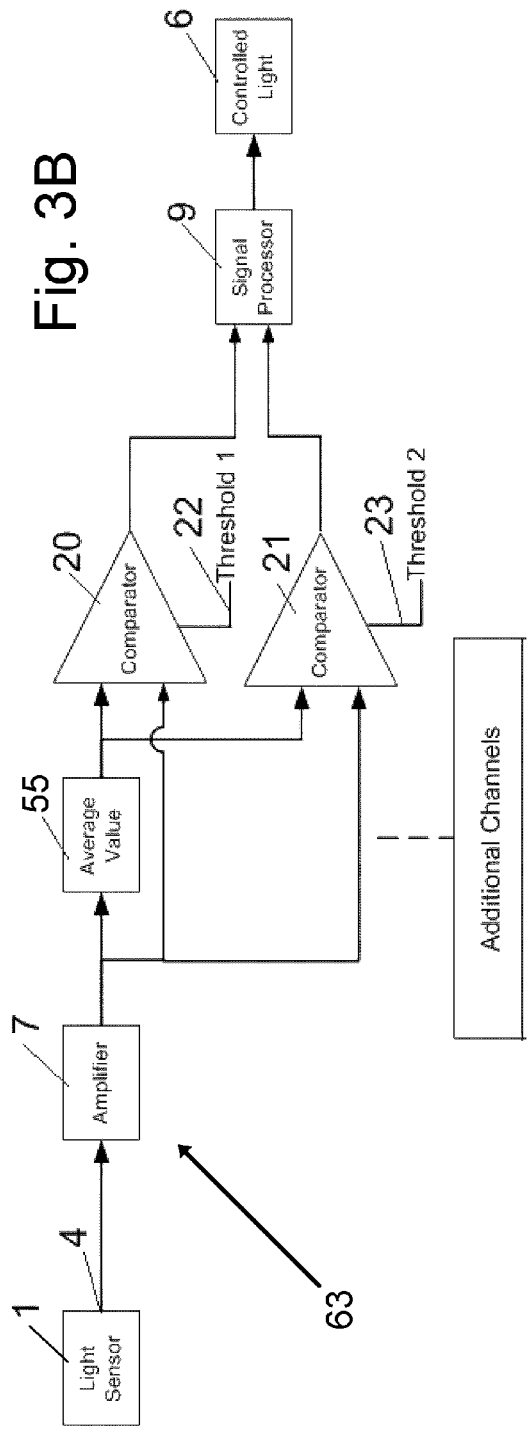
Fig. 3A
Fig. 3B

LIGHT LEVEL AND LIGHT LEVEL RATE OF CHANGE SENSOR

BACKGROUND

1. Technical Field

The disclosure relates to an optical sensor which can detect light level and light level rate and direction of change.

2. General Description of the Problem

Kitchen and bathroom cabinets, particularly those below countertops, are often dark even with the cabinet door open and the room where the cabinet is located has a high level of ambient lighting. Adding light sources within cabinets is often difficult because these areas do not typically have outlet plugs. To simplify the installation of lighting, battery operated lights have been used. The use of lighting in these areas is typically brief and intermittent and to conserve battery power the lights are designed to switch states, such as from on to off or off to on, with opening and closing of the cabinet door, and sometimes after a short period after opening of the door. This has been accomplished by any one of a number of devices including mechanical switches, magnetic switches, ultrasonic motion sensors, microwave motion sensors, active and passive infrared motion sensors and photoelectric sensors combined with timers.

Mechanical and magnetic switches can be attached directly to the cabinet door and/or door frame and if properly installed reliably detect whether or not the door is open or closed. The light operated by the switch turns on immediately when the door is opened and turns off immediately upon its closure. A timer can also be built in to turn the light off after a predetermined period of time if the door is left open. In order to make sure the contacts are closed when the cabinet door is closed, these types of switches must be mounted to the door and/or door frame in such a manner that they align properly when the door is closed. Achieving proper alignment of contacts during installation can make installation difficult where poor installation might keep the product from operating properly. In cases where two doors are used, as is often the case under sinks, two sets of switches are installed, which increases the chance of installation error. These types of switches use wires that run from the switch on the door frame to the lighting device which is usually installed off the door inside the cabinet. The wires are vulnerable to damage as items are placed in or removed from the cabinet.

Using motion sensors to control interior cabinet light activation can simplify installation by reducing the number of components to install and eliminating exposed wires inside the cabinet. A variety of motion sensor technologies exist including, ultrasonic, microwave and passive infrared motion sensors that can reliably generate signals in response to cabinet door movement. They tend to be less reliable in distinguishing the direction of movement. They also distinguish poorly between opened and closed stationary doors. As a result they can fail to turn a light off immediately upon closure of the door and in some instances can turn the light on when the door is being closed. Passive infrared motion sensors may not work if an object is placed in the cabinet at a location which obstructs the field of view of the light collecting lens. Passive infrared motion sensors tend to exhibit a noticeable delay from initial movement of the door until the light turns on. Microwave motion sensors generate microwaves which can penetrate the door and turn on the light when there is motion adjacent to the cabinet even if the door is not moved.

Active infrared motion sensors respond to motion and are used for lighting control. These devices typically use a light emitting diode (LED) to emit infrared light in front of the sensor. An infrared photodiode or transistor detects the infrared light upon reflection by nearby objects. Changes in the detected amount of infrared light indicate motion in front of the sensor. One such device is the General Electric LED Motion Sensing Light Model #17433. This device detects motion within a few inches in front of the sensor. When used in a cabinet the system does not respond immediately when the door is opened but responds upon someone reaching into the cabinet. As with passive infrared motion sensors, this type of sensor is sensitive to field of view considerations.

Photoelectric sensors can also be used to turn on a light when a door is opened. This type of sensor detects the increase in light level when a door is opened and turns on a light.

An example of a photoelectric sensor product is the Automatic Closet Light; model EZT-ACL, from Touch and Glow Lighting Solutions. This alternating current (AC) product is screwed into an ordinary light bulb socket and then a light bulb may be screwed into it. The light bulb turns on when the door is opened for a period of time that is user selectable. The product uses a single, fixed light level threshold to determine if the door is open or closed. Under conditions of low ambient room lighting the light level in the closet may never rise above the threshold when the door is opened. In a bright environment the light level may not drop below the threshold when the door is closed and again the light will not turn on when the door is opened. The product does not differentiate between slowly changing light levels, as when a door opens, and fast changes in light level as when a room light is turned on.

Ambient light sensors are also used in vehicles and with hand held electronic devices to control the illumination levels of displays, typically increasing brightness of the display as ambient light levels increase. U.S. Pat. No. 7,297,929 teaches a multi-element sensor for detecting light over wide angles and in multiple optical zones. Detected light level values are stored and luminosity of a light source determined based on historic (i.e. the stored) light readings.

SUMMARY

An optical sensor controlled lighting system comprises an ambient light sensor responsive to ambient light levels for generating an output signal proportional to the ambient light level. A light source having states including full on and off is controlled by circuit elements providing for developing a rate of change for the output signal and further providing for, responsive to the rate of change, switching the light source between states where the rate of change has specified characteristics or falls within a given range.

BRIEF DESCRIPTION OF THE DRAWINGS

FIG. 3A is a block diagram of an optical sensor using average values to provide operation over a broad range of illumination levels.

FIG. 3B is an alternate block diagram of an optical sensor using average values to provide operation over a broad range of illumination levels.

FIG. 7 shows a typical output signal from the amplifier of FIG. 5 when an incandescent lamp is turned on.

FIG. 8 shows a typical output signal from the amplifier of FIG. 5 when a fluorescent lamp is turned on.

FIG. 9 shows a typical output signal from the amplifier of FIG. 5 when a compact fluorescent lamp is turned on.

DETAILED DESCRIPTION

Figure 1:
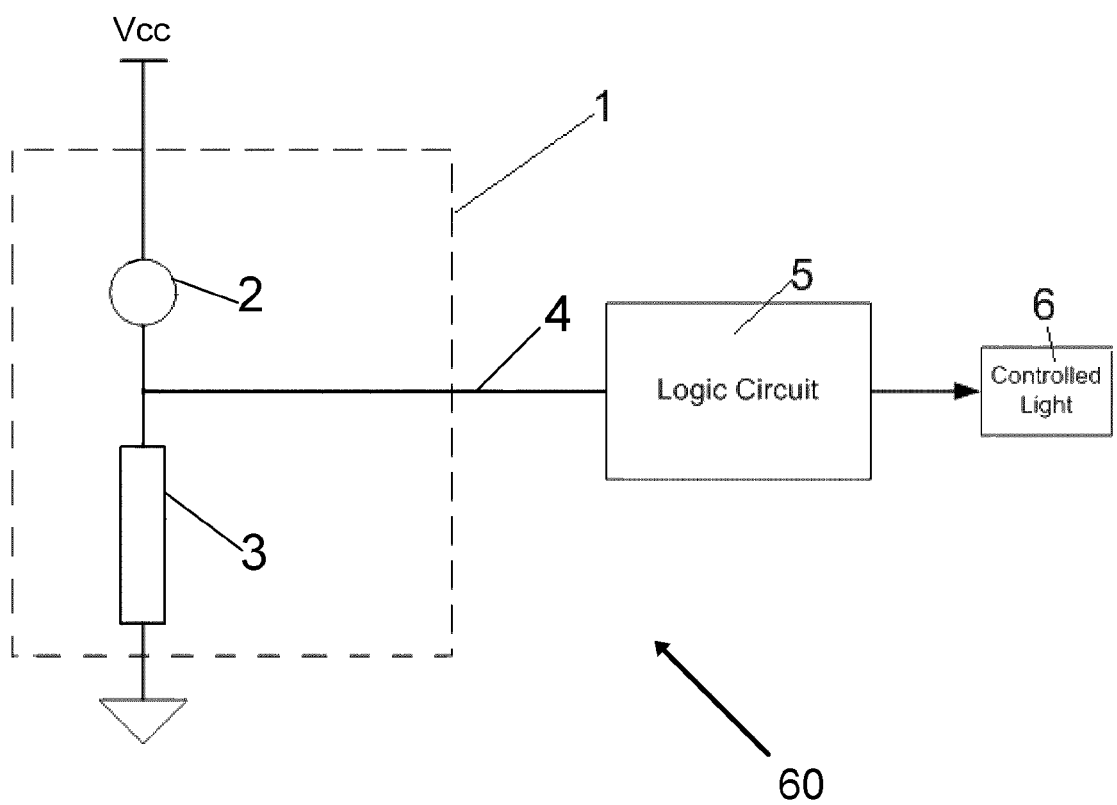
FIG. 1 is a block diagram of a typical prior art optical sensor controlled lighting system.

In the following detailed description, like reference numerals and characters may be used to designate identical, corresponding, or similar components in differing drawing figures.

Referring to FIG. 1, a prior art sensor controlled lighting system 60 is illustrated. A light sensor 1 is made up of a photo sensitive resistor 2 and a fixed resistor 3 connected in series between a voltage source Vcc and ground to operate as a simple voltage divider generating an output signal on output 4. Devices such as photo diodes and photo transistors can be substituted for the photo sensitive resistor 2. Typically the resistance of the photo sensitive resistor 2 decreases with increasing light level. The value of the fixed resistor 3 is typically chosen so that at a fixed light level the resistance of the photo sensitive resistor 2 is approximately equal to the value of the fixed resistor 3. At the selected light level the voltage level on output 4 of the light sensor 1 will be equal to the input voltage threshold of the logic circuit 5. If the light sensor output 4 transitions from below this voltage threshold to above the threshold, the logic circuit 5 will turn on the controlled light 6. The use of a single threshold results in there being only one light level that causes the controlled light 6 to turn on. The circuit does not distinguish between different rates of change in light level.

Figure 2:
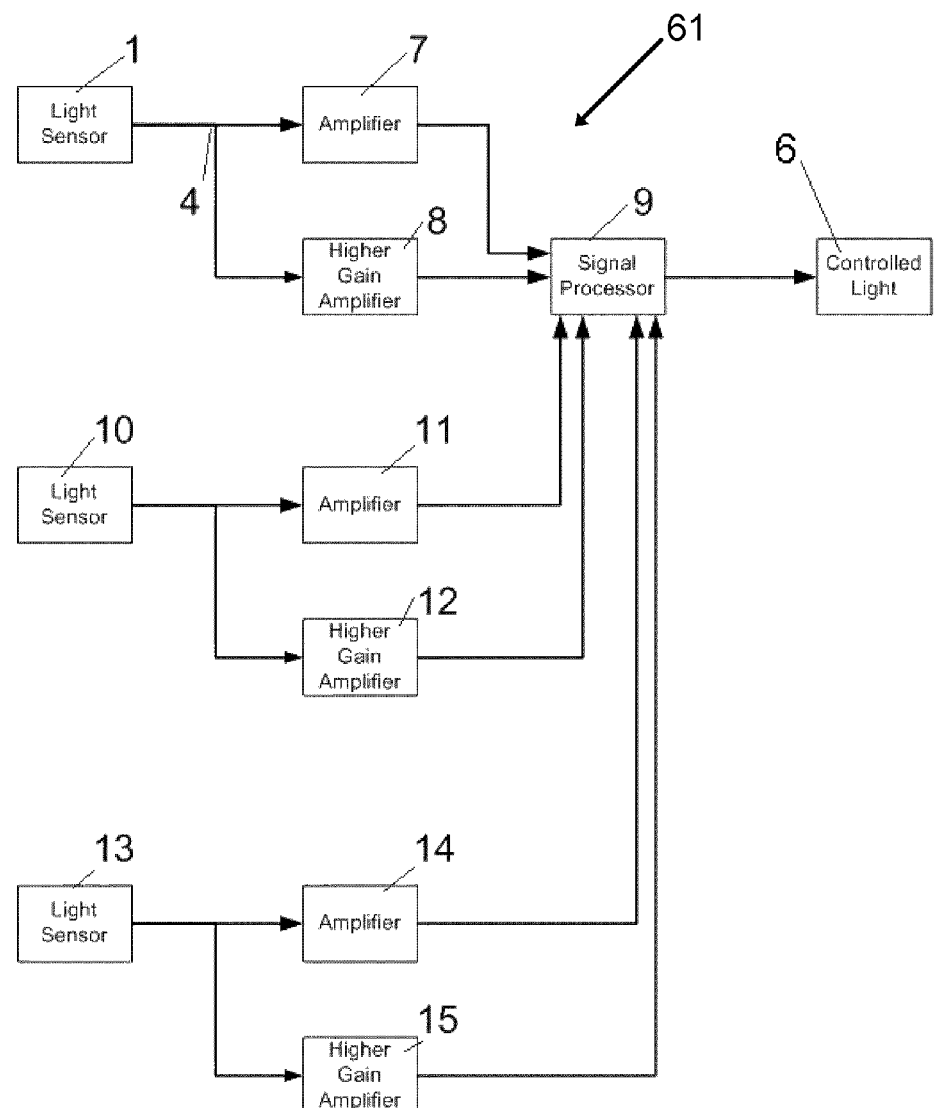
FIG. 2 is a block diagram of an optical sensor using multiple signal channels to provide operation over a broad range of illumination levels.

Referring to FIG. 2, a sensor controlled lighting system 61 is illustrated that employs multiple channels to operate over a broad range of illumination levels and discriminates between slowly and quickly changing ambient light levels. Light sensor 1 converts light intensity to an electrical signal on output 4 as described in FIG. 1. The output of light sensor 1 is applied to amplifiers 7, and 8. The amplifiers 7, 8 amplify the signal on output 4 to levels that, at a nominal light level selected by fixed resistor 3, cross the input threshold of signal processor 9 at different times. Because higher gain amplifier 8 and amplifier 7 have different gains, the result will be two different light level thresholds that result in the amplifier outputs crossing the input threshold of signal processor 9; a first lower light level threshold and a second higher light level threshold. If the signal on light sensor output 4 is increasing from below the nominal light level, the output of higher gain amplifier 8 will cross the input threshold before the output of amplifier 7 crosses the input threshold. This time differential is proportional to the speed with which the light level is changing. Similarly, if light levels are decreasing from above the nominal light level, the output of amplifier 7 will cross the input threshold before the output of higher gain amplifier 8 crosses the input threshold. Different rates of light level change may now be discriminated against. Making the gain differential between higher gain amplifier 8 and amplifier 7 small results in a short delay between when their output signals cross the input threshold of signal processor 9. This allows the signal processor 9 to turn on the controlled light 6 very quickly.

The output of light sensor 10, directed into parallel amplifiers 11, 12, provides a second channel at a second nominal light level. Light sensor 13 and amplifiers 14, 15 provide a third channel at a third nominal light level. By adding additional channels, a large number of light levels can be monitored. Sufficient light level changes at light sensor 10 results in changes in the outputs of each of these channels as input thresholds are crossed providing the ability to detect absolute and time rate of changes across a wide variety of lighting conditions and to generate a rate of change signal related to the time rate of change of ambient light levels.

Referring to FIG. 3A, an alternate embodiment of sensor controlled lighting system 62 is shown which operates over a wide variety of lighting conditions. In sensor controlled lighting system 61 shown in FIG. 2, each channel detects one light level and a large number of channels are required to detect a comparably large number of distinct threshold levels of ambient light. In sensor controlled lighting system 62 a single channel can detect increases or decreases in light level over a wide range of light levels. More than one channel may still be used to expand the range of light levels the system operates over, but the number of channels necessary will be reduced compared to sensor controlled lighting system 61 to achieve the same range of operation.

As with sensor controlled lighting system 61, the difference in gain between amplifier 7 and higher gain amplifier 8 results in a first light level threshold and a second light level threshold. The output of amplifier 8 is connected to average value generator 17, typically made up of a simple low pass filter. The output of average value generator 17 changes slowly compared to the signals expected at the output of amplifier 8 when light levels change in the environment of the device. The term "expected" relates to the expected rates of change in ambient light levels stemming from turning a light on or opening a door within a "normal" range of speeds. Comparator 18 compares the average value of the output of amplifier 8 to the current output of amplifier 8. If the output of amplifier 8 exceeds the average value 17 by a threshold 19, the output of comparator 18 will switch high. If the current signal is not changing, it will be close to the average value and the output of comparator 18 remains low. If the output of amplifier 8 is increasing, it will rise above the output of average value generator 17 and the comparator will switch high if the threshold is exceeded. Similarly, the output of comparator 16 will also switch high in response to increasing light levels, but at a later time due to the lesser gain of amplifier 7. The difference in time between when comparators 16 and 18 go high is proportional to the speed with which the light level is changing. To detect decreasing light levels, the comparators 16 and 18 would be arranged to detect when the outputs of amplifiers 7 and 8 were below the output signals from average value filters 55 and 17, respectively, by threshold 19. The gains of the two amplifiers 7, 8 can be chosen so that the time between each comparator going high is very short allowing the signal processor 9 to turn the controlled light 6 on very quickly when, for example, light levels increase due to opening of a door. The points defining the rate of change correspond to the points in time where the gains of the respective amplifiers 7, 8 cross the preset threshold. It may be observed that a door could be opened very slowly to produce a very slowly increasing ambient light level at the location of the sensor controlled light system 62 in order to defeat operation of the sensor controlled light system 62.

FIG. 3B shows an alternate sensor controlled lighting system 62. Only one amplifier 7 and average value filter 55 are used. Each comparator 20, 21 has its own threshold for generating a rate of change, threshold 1 (applied to input 22) and threshold 2 (applied to input 23), respectively. If threshold 2 is larger than threshold 1, the output of comparator 21 will switch high a little later than the output of comparator 20. The time difference between when the two comparators 20, 21 switch high will be proportional to the speed with which the light level is changing. Threshold 1 and threshold 2 can be chosen so that the time between each comparator going high is very short allowing the signal processor 9 to turn the controlled light 6 on very quickly.

Figure 4:
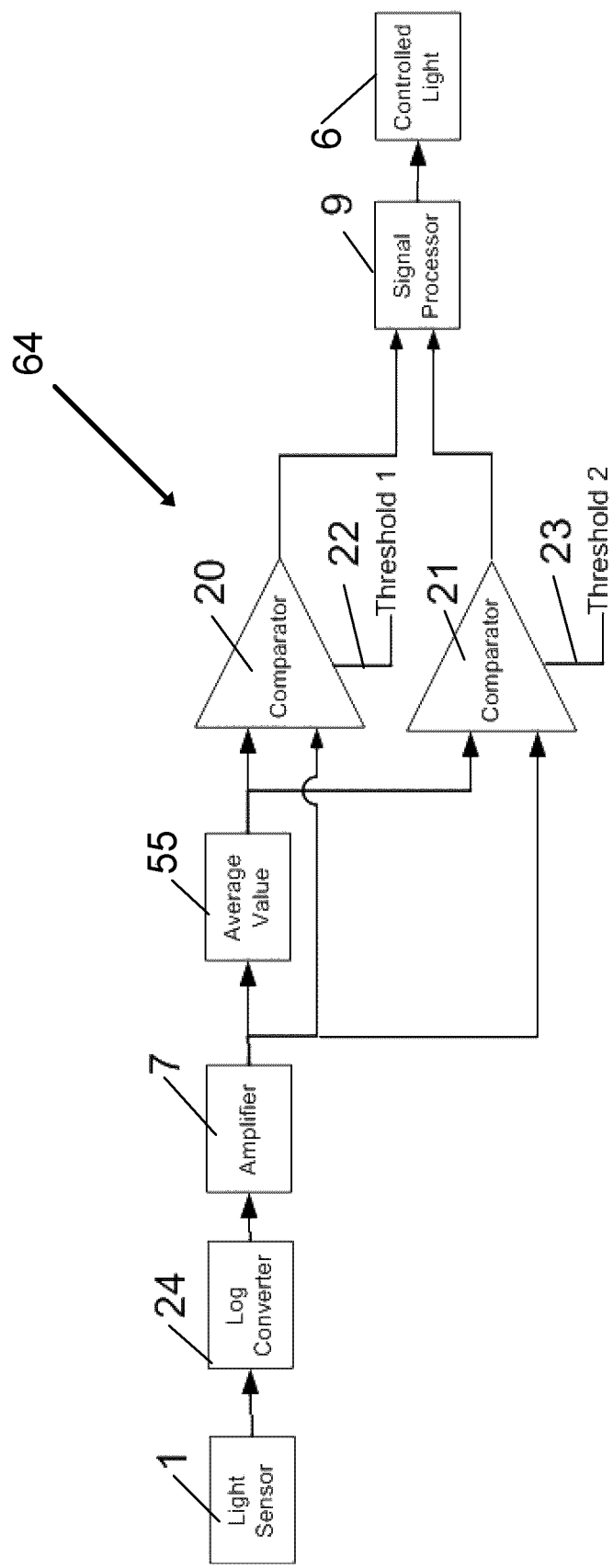
FIG. 4 is a block diagram of an optical sensor that uses a log converter to provide operation over a broad range of illumination levels.

Referring to FIG. 4, still another sensor controlled lighting system 64 is shown which handles a wide dynamic range of the ambient light levels. A log converter 24 is used to reduce the dynamic range of the light sensor 1 output. For instance, the log function would reduce a 1000:1 ambient light level change to only 3:1 which can easily be accommodated by a single amplifier. The remaining components in sensor controlled lighting system 64 are the same as those in sensor controlled lighting system 62.

Figure 5:
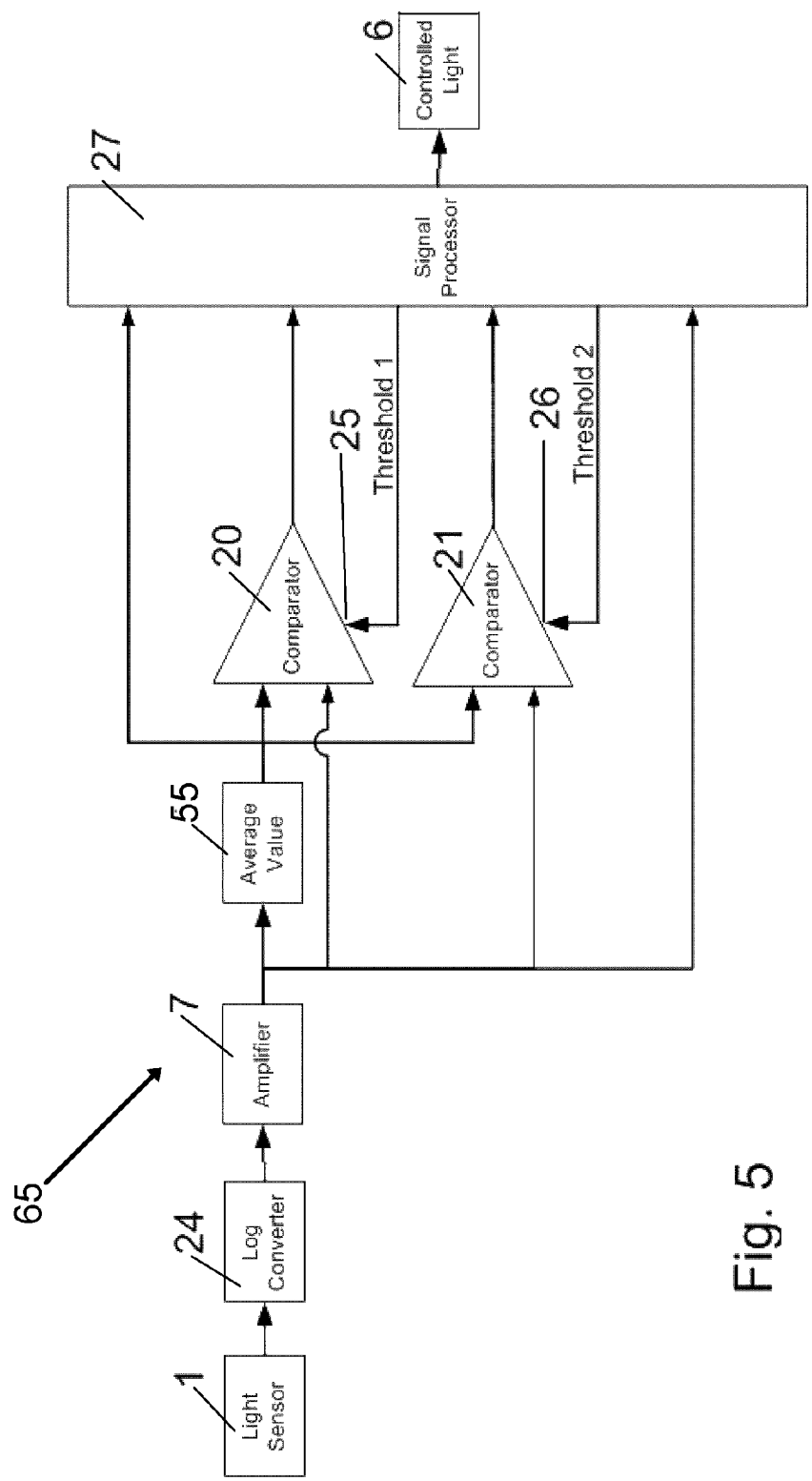
FIG. 5 is a block diagram of an optical sensor that dynamically determines the threshold values used in the comparators.

Referring to FIG. 5, a sensor controlled lighting system 65 incorporates a signal processor 27 which monitors the outputs of amplifier 7 and average value filter 55 as provided above. These two output are analyzed and values for threshold 1 (applied to input 25) and threshold 2 (applied to input 26) are calculated dynamically. This analysis provides that:

1. Instead of using fixed values for threshold 1 and threshold 2, the thresholds can be calculated as a percentage of the output of either average value filter 55 or amplifier 7, thus insuring a uniform response over a broad range of light levels;
2. The thresholds applied at inputs 25 and 26 can be selected as either positive or negative allowing for the detection of both increasing light levels and decreasing light levels as occurs when a door opens or closes, respectively;
3. The calculation of threshold 2 can be delayed relative to the time that comparator 20 indicates that threshold 1 has been passed. This allows the signal processor 27 to ignore a brief period of time after comparator 20 has indicated that the light level is increasing. This delay can be selected so that the relatively fast changes in light level that occur when a room light is turned on are ignored. If threshold 2 is calculated after this delay as a percentage of the output of amplifier 7, the threshold will not be met if the light level change was fast enough that it was done changing at the time threshold 2 was calculated. If the delay is chosen so that slower changes in light level will still be increasing after threshold 2 is calculated, it is possible to discriminate between lighting level changes associated with lights turning on and doors opening.
4. The time between when threshold 2 is calculated and the time that comparator 21 indicates that the threshold has been passed is proportional to the speed with which the light level is changing. This time difference can also be used, alone or in conjunction with a delay, to discriminate between fast and slowly changing light levels.
5. A variation of this system would not measure rate of change in ambient light levels. A single light level trigger could be used but short duration signals, as might occur as a result of turning a light on in a room with a cabinet door open, could be ignored while a more sustained difference, as would result from opening a door to a lit room would result in the light source being turned on.
6. Another variation would be to use different light levels and delays as triggers without developing a rate of change signal.

Many of the function blocks shown in FIG. 2, FIG. 3, FIG. 4, and FIG. 5 can be implemented using analog components, digital components, firmware in a microprocessor, or a combination of all three. In some cases an analog to digital (A/D) converter may be used to convert analog signals into a format that can be manipulated as per the above block diagrams within a microprocessor. Although not shown in the block diagrams, the use of such converters is contemplated under some circumstances.

Figure 6:
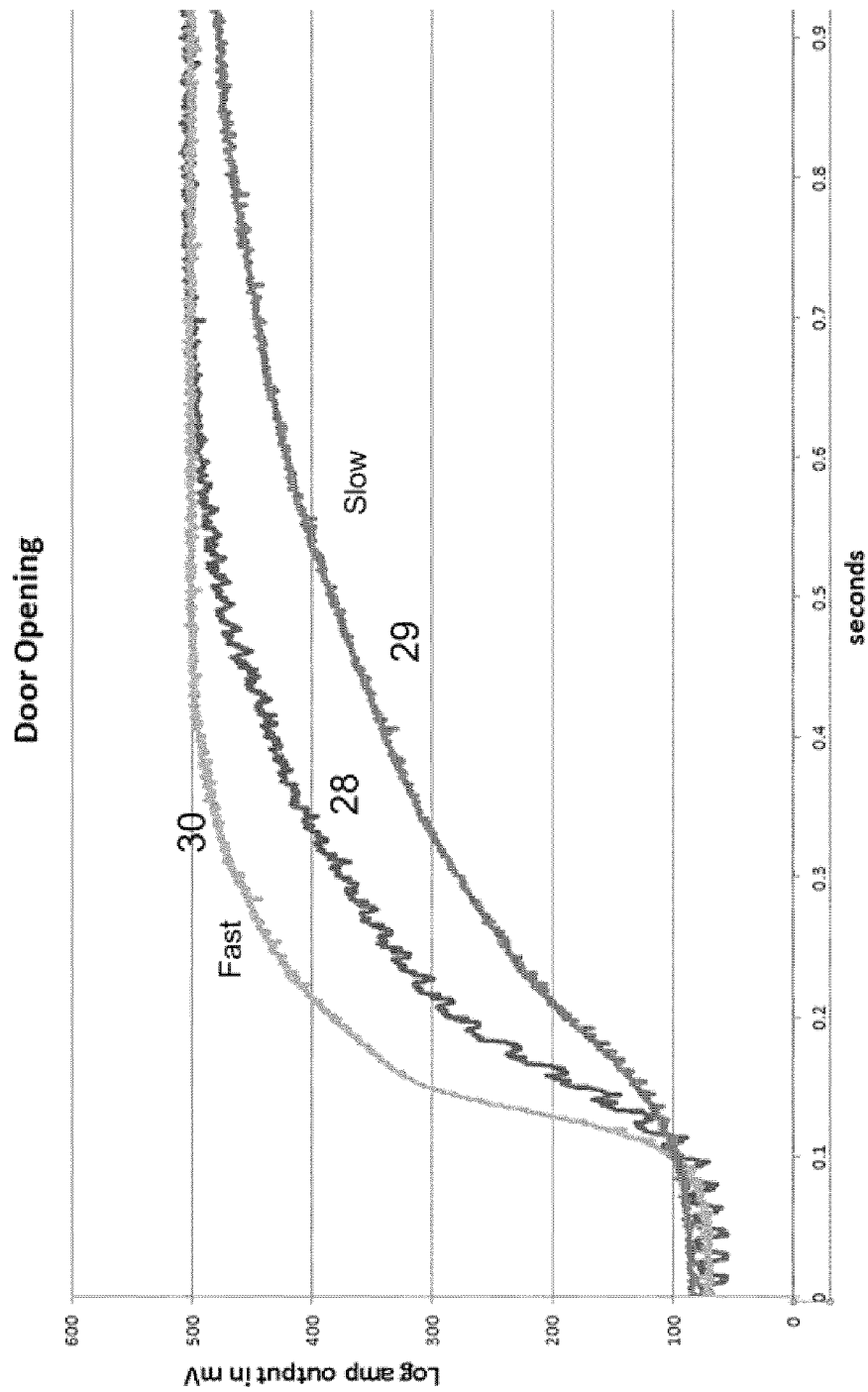
FIG. 6 shows typical output signals from the amplifier of FIG. 5 when a door is opened.

Referring to FIG. 6, several output signals 28, 29, 30 from the amplifier 7 in FIG. 5 are shown. The sensor controlled lighting system 65 was located in a cabinet and the signals resulted from opening a cabinet door to an area fully illuminated at a constant level. Increasing output signals 28, 29, 30 correspond to increases in light level in the cabinet as the door is opened at a steady speed over periods varying from about 0.4 seconds to 1.0 seconds. Signal levels will vary depending on how well lit the room is, but the signals shown are typical. Signal 28 is the result of opening the door at a slow rate. The signal level is seen to increase gradually as the cabinet door is opened. Opening the door more slowly results in a slower signal 29, while opening it more quickly results in a faster signal 30. After about 50 mS from the start of the light increase, all three signals have relatively slow rates of increase. However, the faster signal 30 has a fairly fast rate of increase during the first 50 mS, increasing over 200 mV in the first 50 mS.

Figure 7:
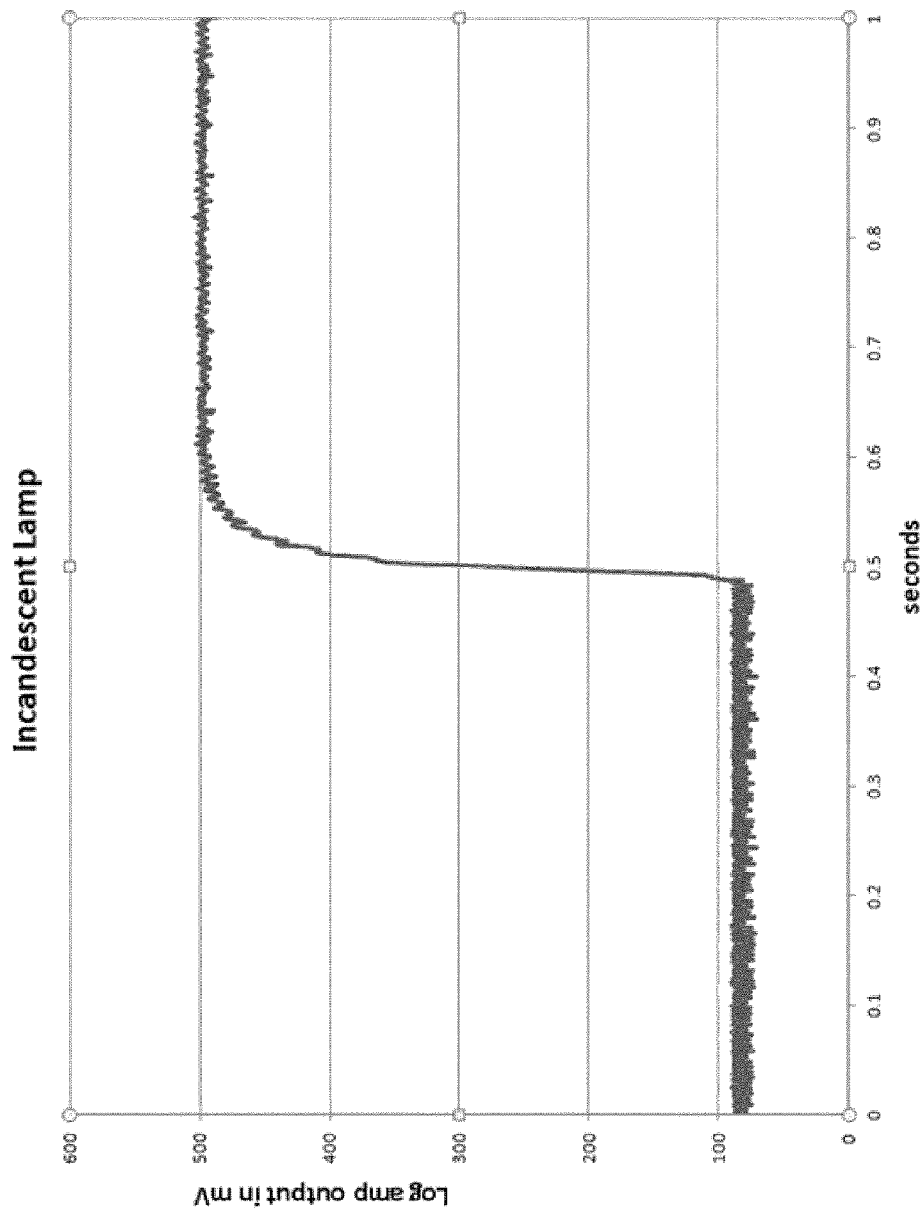

Referring to FIG. 7, the output signal from the amplifier 7 in sensor controlled lighting system 65 is shown changing in response to an incandescent light turning on where the sensor lighting system is exposed to an incandescent light in a modestly sized room. This signal strength grows considerably faster than the signals shown in FIG. 6. The signal has reached its final value in about 100 mS and it rises over 450 mV in the first 50 mS.

Figure 8:
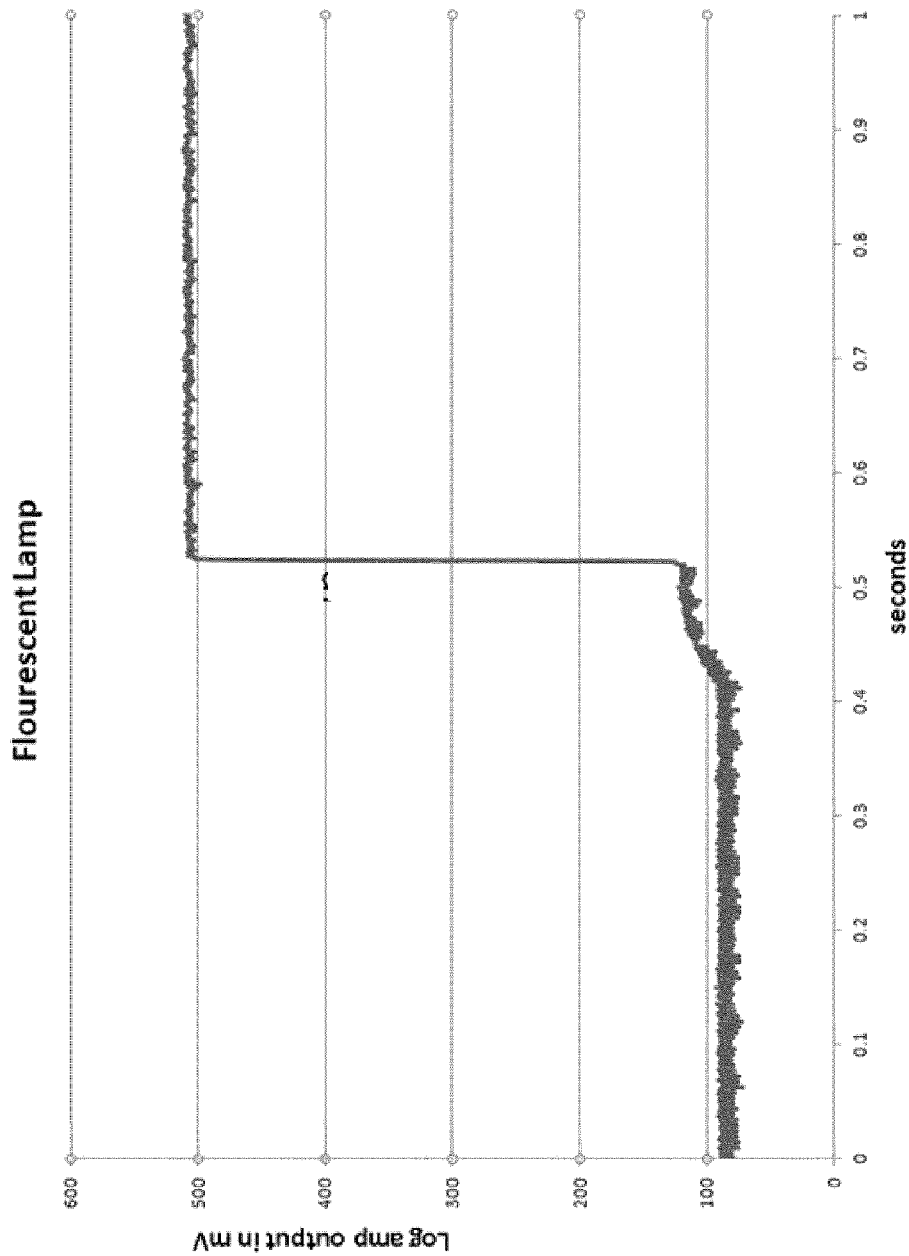

Referring to FIG. 8, the change in the output signal from the amplifier 7 of sensor controlled lighting system 65 in response to a fluorescent light turning on under the same conditions as described with reference to FIG. 7. There is an initial slow increase in light level for about the first 100 mS, followed by a very fast increase to its final value. The final value is reached in about 120 mS from the initial increase in light level.

Figure 9:
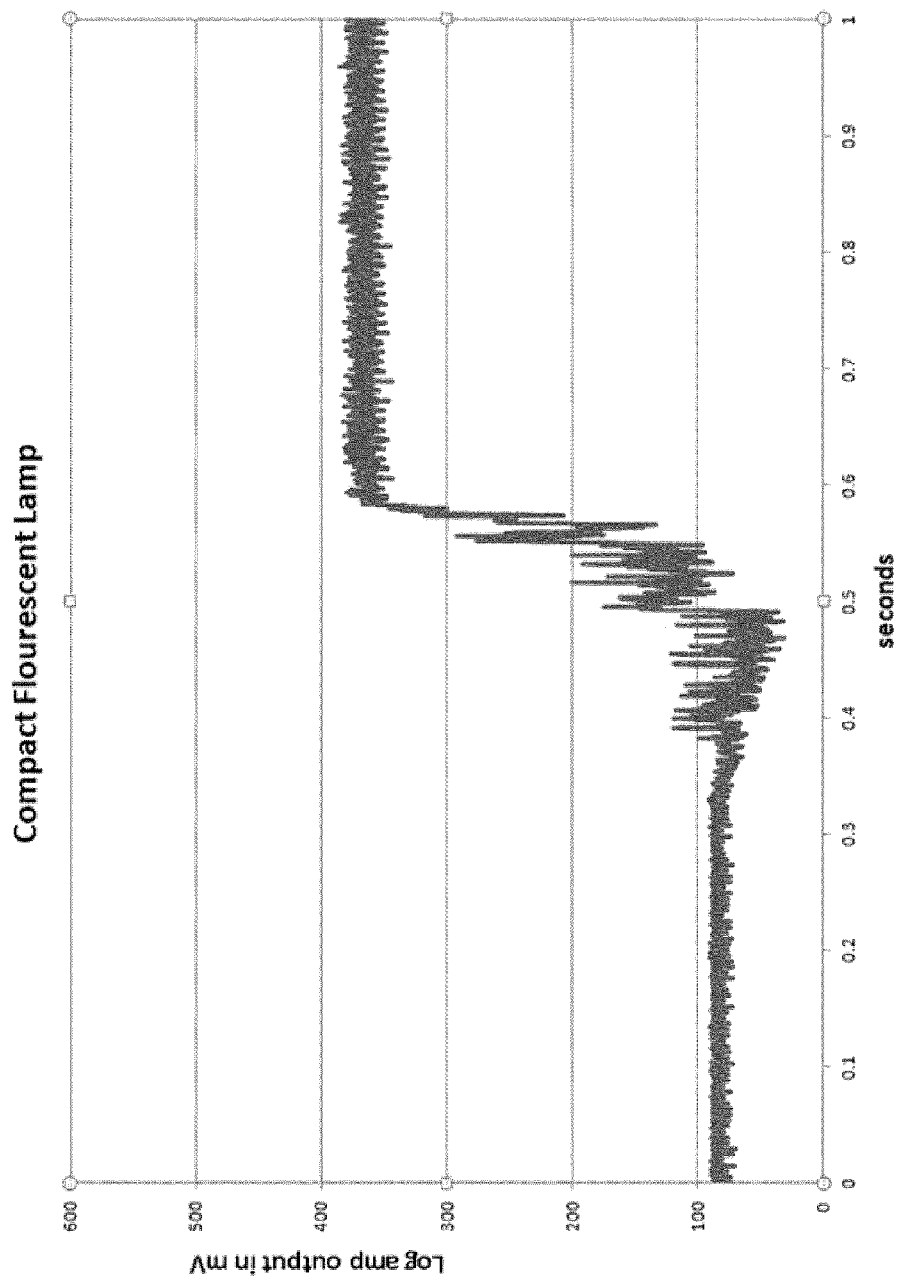

Referring to FIG. 9, the output signal from the amplifier 7 sensor controlled lighting system 65 is shown in response to a compact fluorescent light (CFL) turning on. In this case the signal reaches its final value in about 200 mS but the transition is very noisy.

To illustrate the procedure for discriminating between a door opening and a light turning on FIG. 4 is referred to. It may be assumed that the value for threshold 1 is 100 mV and the value for threshold 2 is 200 mV. From FIG. 6 it is seen that the fast waveform 30 will cross threshold 2 about 20 mS after it crosses threshold 1. Similarly, waveform 28 will cross threshold 2 after about 50 mS and waveform 29 will cross threshold 2 after about 100 mS. Referring to FIG. 7, it is seen that the difference in time between threshold 1 and threshold 2 for an incandescent light turning on will be less than 10 ms. A criterion that simply required the time differential between threshold 1 and threshold 2 to be 20 mS or more would turn on the light when the door is opened and never turn on the light if an incandescent light were turned on with the door opened.

Now referring to FIG. 8 it is seen that a fluorescent light turning on will cross threshold 2 about 100 mS after it crosses threshold 1. In this case, the simple requirement that threshold 2 occur at least 20 mS after threshold 1 would fail and the controlled light 6 would turn on when the fluorescent light turned on. One solution would be to simply increase the values for threshold 1 and threshold 2, for instance to 150 mV and 250 mV, respectively. While this would successfully ignore a fluorescent light turning on, it would also ignore all signals smaller than 150 mV, such as might occur if a door is opened to a very dimly lit room.

In order to successfully ignore the fluorescent light and still accurately detect a door opening in a dimly lit room, the method shown in FIG. 5 can be used. Still referring to FIG. 8, the initial value of the signal is about 80 mV which would be the output from average value filter 55 for sensor controlled lighting system 65 in FIG. 5. The signal processor 27 would calculate a value for threshold 1, for instance 1.05×80 mV=84 mV. After a delay of, for instance, 150 mS, the signal processor 27 would calculate threshold 2 based on the current output of amplifier 7, or about 510 mV in this illustration. For instance, threshold 2 might be calculated as 1.10×510 mV=561 mV. Since the signal never reaches this level in this example, threshold 2 will never be crossed and the controlled light 6 will not be turned on. For the fast signal 30 in FIG. 6, threshold 1 (84 mV) will be crossed at about 80 mS. A delay of 150 mS would be 230 mS and the signal is at about 420 mV. The value of threshold 2 would be calculated as 1.10×420 mV=462 mV. Threshold 2 would be crossed at about 290 mS. The difference in time between when threshold 2 is calculated and when threshold 2 is crossed is about 60 mS. Since this time is greater than 20 mS, the controlled light 6 will be turned on. If the time were less than 20 mS, the light would be left off since the signal was still moving too fast even after the 150 ms delay.

Referring to FIG. 9, it is seen that the noisy transition of the CFL lasts longer than 150 mS. Since the signal is still moving up and down rapidly after this time it is likely that the time between when threshold 2 is calculated and when threshold 2 is crossed will be less than 20 ms and the controlled light will remain off. However, some CFL's may behave differently and there is a chance that the controlled light might turn on. To reduce this possibility, the signal processor 27 in lighting system 65 can monitor the signal between the times it crosses threshold 1 and when it crosses threshold 2, for instance counting peaks of a certain size. If there are many peaks it is likely that the signal is from a CFL and the controlled light would not be turned on. Other criteria for the shape of the signal between threshold 1 and threshold 2 can be implemented in order to reject specific types of lighting.

If the criteria used to calculate threshold 2 is kept small, for instance 10% as in the above examples, then small signals from a door opening in a dark room can still be detected and the light turned on if it meets the criteria discussed above. If the criteria used to calculate threshold 2 is kept small, for instance 10% as in the above examples, then small signals from a door opening in a dark room can still be detected and the light turned on if it meets the criteria discussed above.

Figure 10:
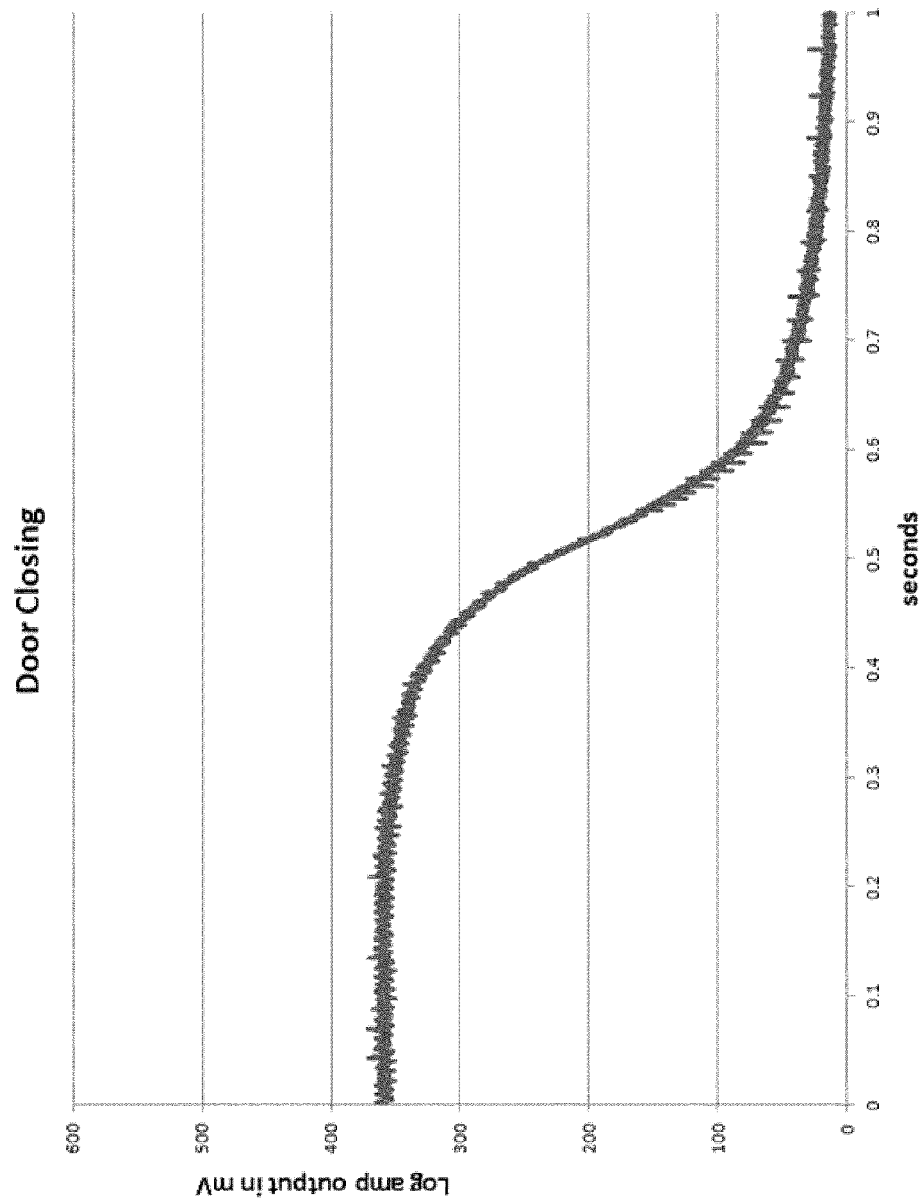
FIG. 10 shows typical output signals from the amplifier of FIG. 5 when a door is closed.
Figure 11:
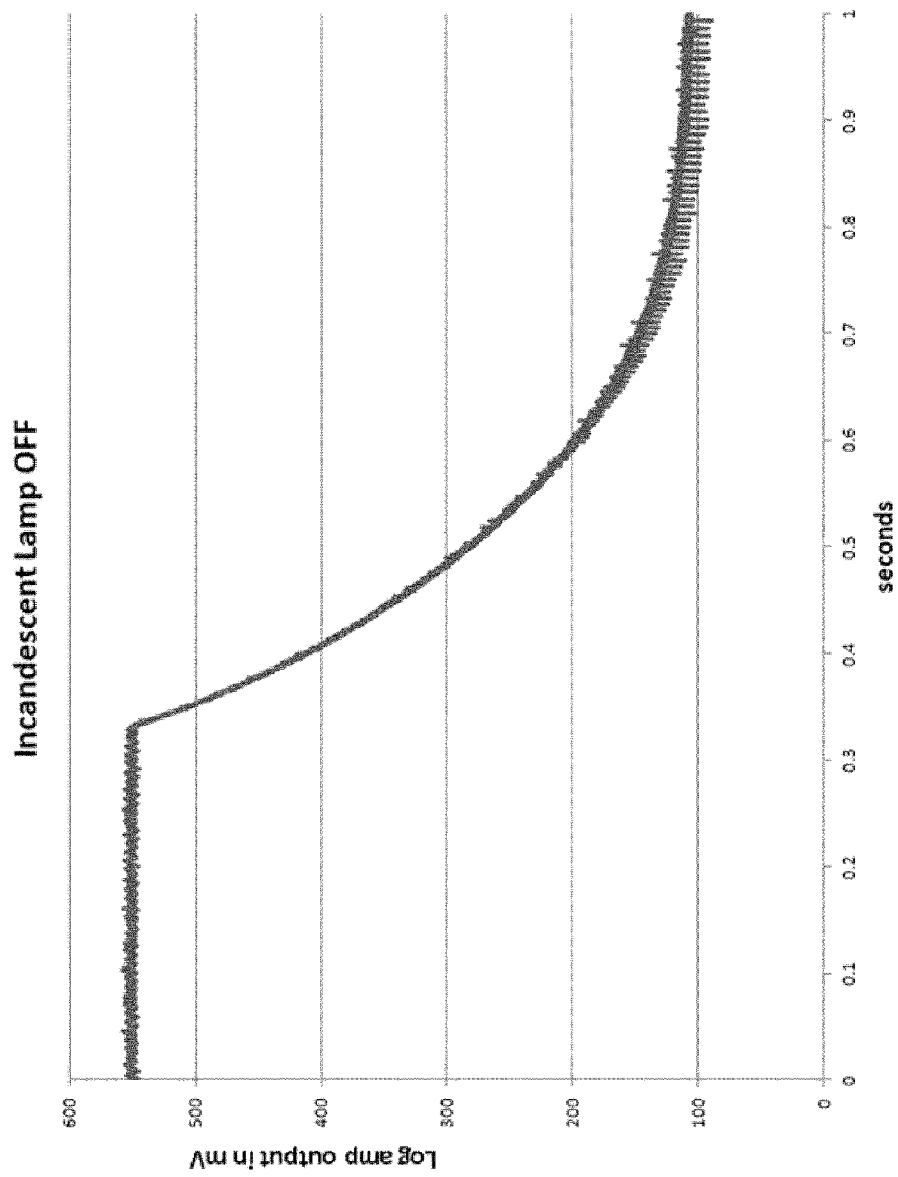
FIG. 11 shows a typical output signal from the amplifier of FIG. 5 when an incandescent lamp is turned off.
Figure 12:
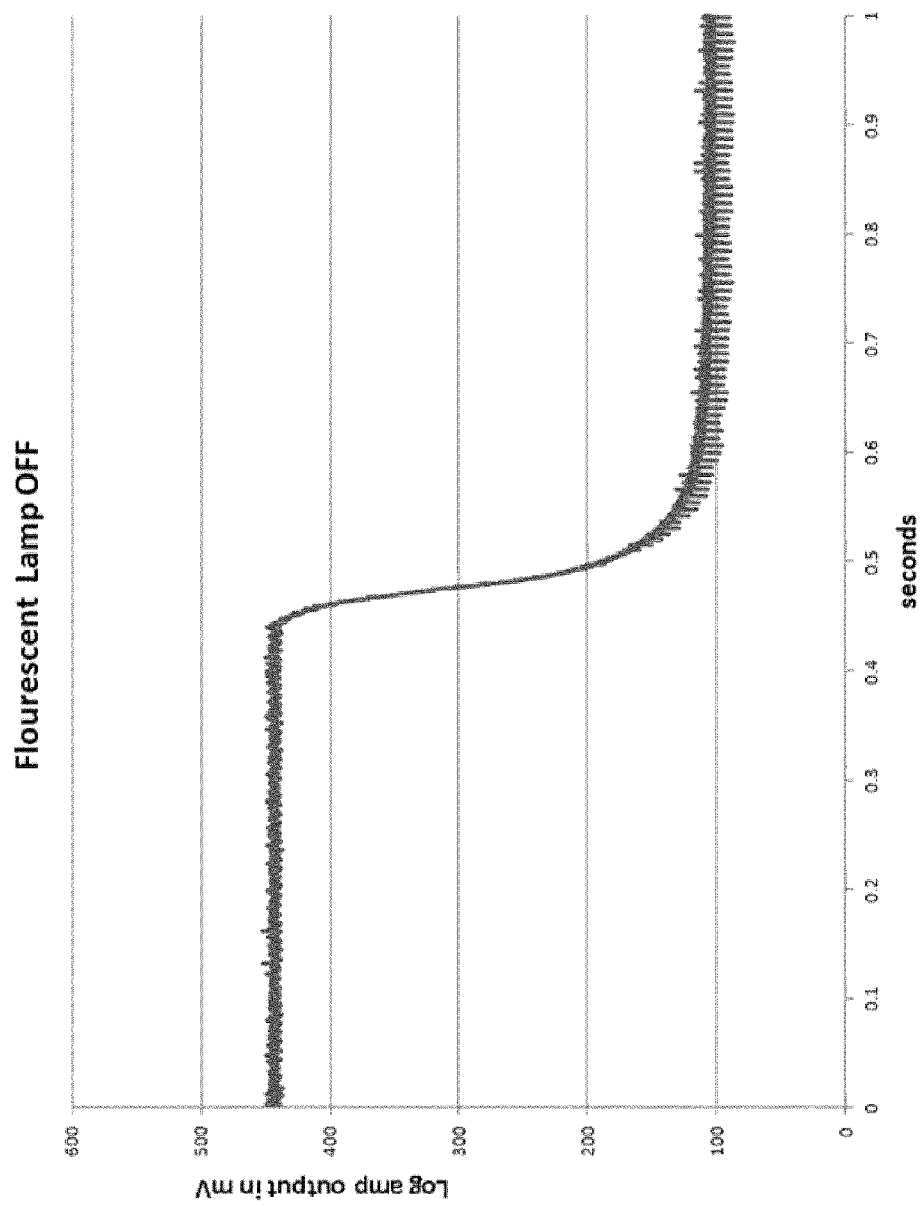
FIG. 12 shows a typical output signal from the amplifier of FIG. 3 when a fluorescent lamp is turned off.
Figure 13:
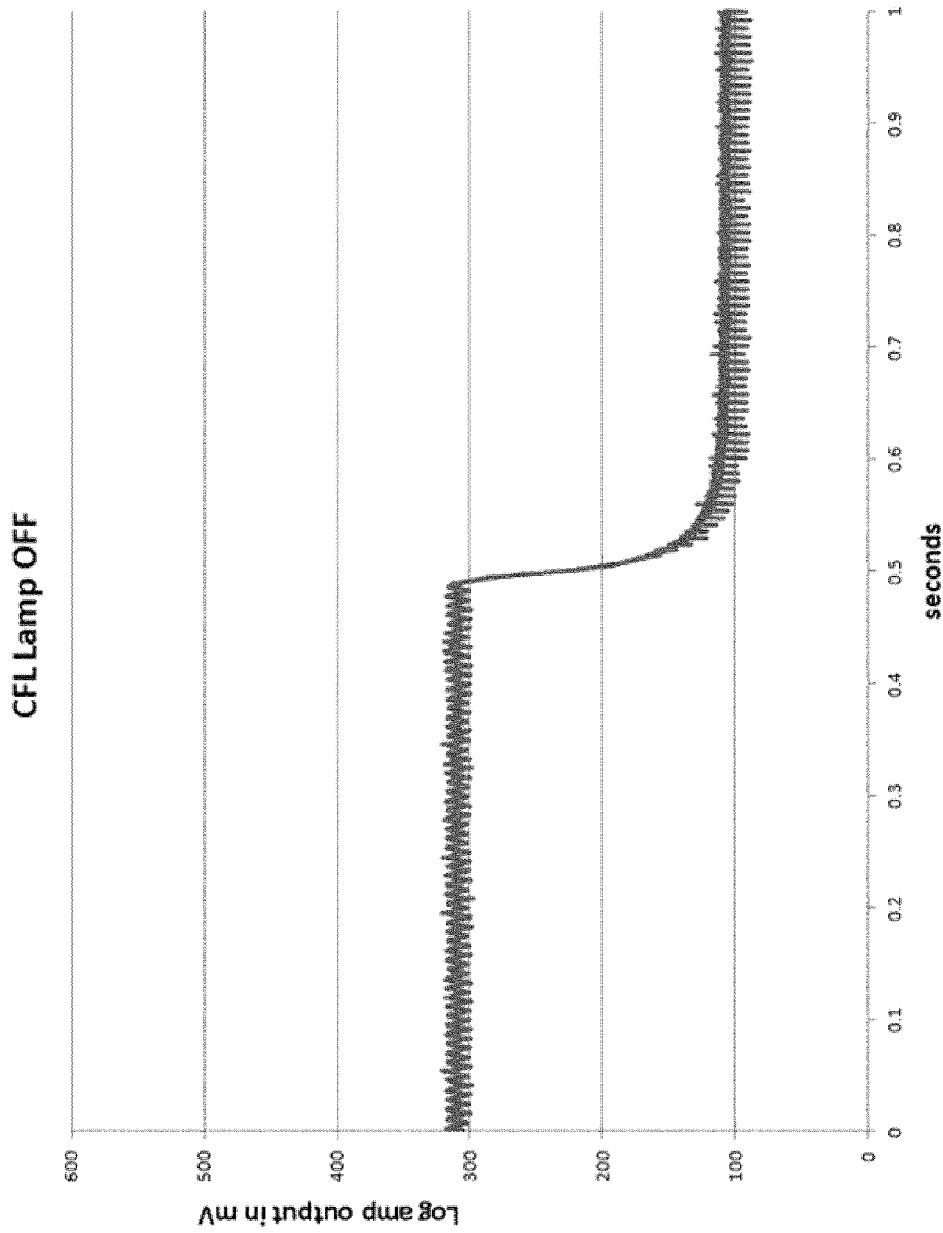
FIG. 13 shows a typical output signal from the amplifier of FIG. 5 when a compact fluorescent lamp is turned off.

The above discussions have dealt for the most part with detecting an increase in light level. Detecting a decrease in light level, as when a door closes or a light turns off, is a very similar process. The primary difference being that the threshold levels must be below the average value of the light level instead of above it. It can be seen in FIG. 12 and FIG. 13 that when a CFL or a fluorescent light turn off the initial decrease in light level is very rapid for the first 50 mS or so and then the decrease becomes more gradual. For this reason it is preferable to shorten or eliminate the delay between when threshold 1 is crossed and threshold 2 is calculated. For instance in FIG. 12, the average value before the fluorescent light turns off is about 440 mV which sets the −5% threshold 1 value at 418 mV and threshold 1 is crossed at about 450 mS. Using a delay of zero, the −10% value for threshold 2 would be calculated to be 418 mV×0.9=376 mV and threshold 2 would be crossed at about 465 mS, or 15 ms later. Similar calculations for the CFL turning off (FIG. 13) would also result in a time difference of about 15 mS between when threshold 1 and threshold 2 are crossed. Similar calculations on an incandescent lamp (FIG. 11) result in a time difference of about 30 mS between when threshold 1 and threshold 2 are crossed. Finally, referring to FIG. 10, similar calculations when a door closes result in a time difference of about 110 mS between when threshold 1 and threshold 2 are crossed. Setting the minimum time difference that will turn off the controlled light 6 to 50 mS will prevent the controlled light 6 from turning off when a room light is turned off but will reliably turn off the controlled light 6 if the door is closed.

One further complication when determining when to turn off the controlled light 6 is that when the controlled light 6 is on it becomes difficult to determine whether or not the door has closed since the light level will remain high. For this reason it is necessary to turn off the controlled light 6 in order to measure the light levels needed to determine whether or not the door has closed. (All waveforms in the figures were measured with the controlled light 6 turned off.) The necessary measurements can still made, but the controlled light must be periodically turned off for a period of time long enough to sample the ambient light level but short enough that it cannot be detected by the human eye.

Figure 14:
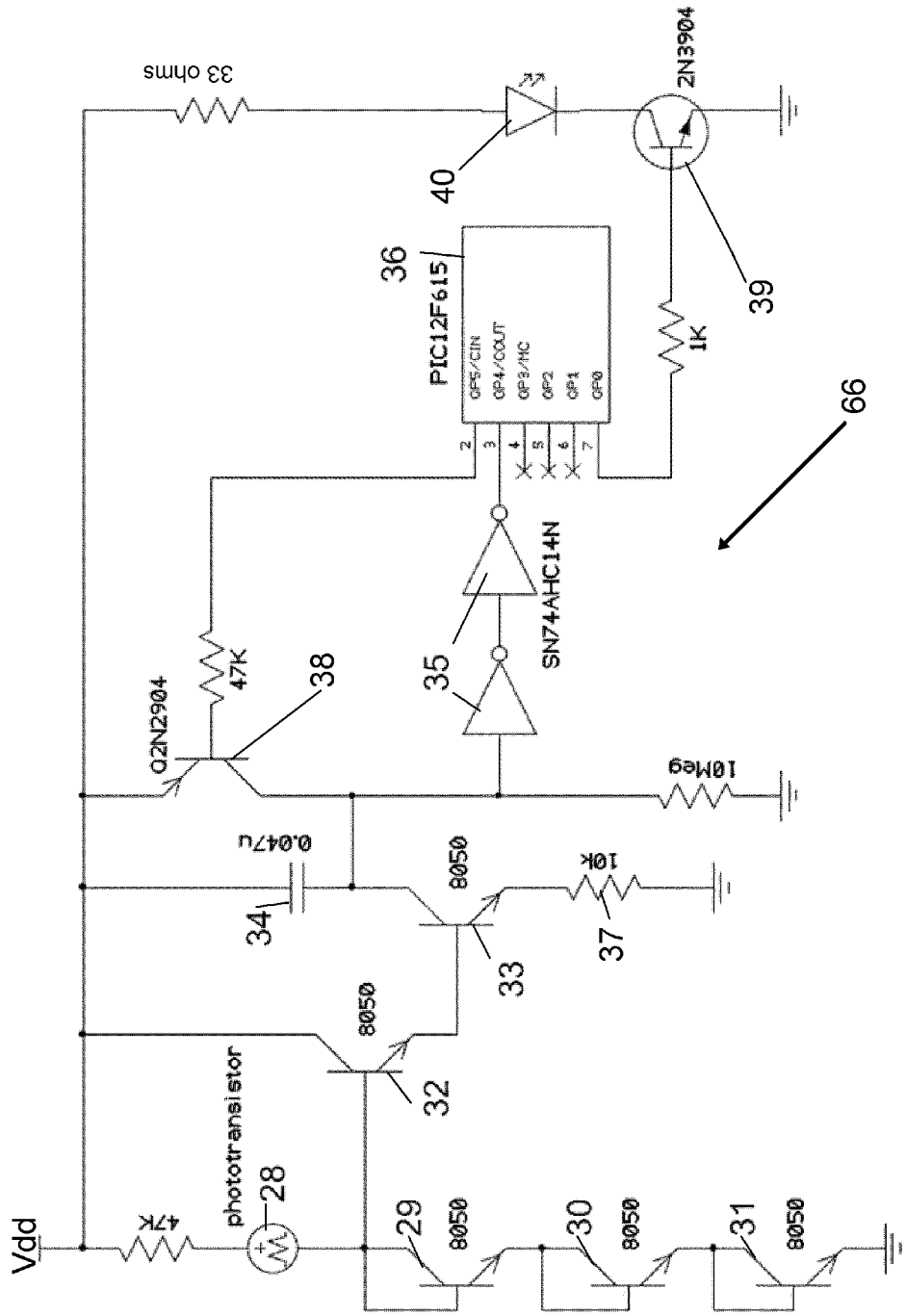
FIG. 14 is a circuit schematic for one embodiment of the present disclosure.

FIG. 14 shows a sensor controlled lighting system 66. A phototransistor 28 is connected in series between a battery source Vdd and chassis ground with a 47 Kohm resistor and three bipolar NPN transistors 29, 30 and 31. Phototransistor 28 sources current in proportion to the intensity of the light that falls upon it. The voltage across transistor 31 is proportional to the log of the current through the phototransistor 28. An emitter follower arrangement comprising a pair of NPN bipolar transistors 32 and 33 apply the voltage at the collector of transistor 29 to resistor 37 connecting the emitter of transistor 33 to ground. This arrangement drains little current away from transistor 31. Transistors 29 and 30 offset the base-emitter voltage drops of transistors 32 and 33 so that the voltage across resistor 37 is the same as the voltage across transistor 31. Since voltage is proportional to the log of the current in the phototransistor 28, the current in resistor 37 is also proportional to the log of the current in phototransistor 28 though greatly amplified.

The current through resistor 37 causes a negative voltage ramp across capacitor 34. When this ramp decreases below the logic threshold of Schmitt trigger inverter 35, the Schmitt trigger inverter applies a signal to an input of microprocessor 36 which turns on a shorting transistor 38 connected across the terminals of capacitor 34. This shorts capacitor 34 to restart the negative voltage ramp. The result is a waveform on input 3 of microprocessor 36 whose period is proportional to the log of the current sourced by phototransistor 28. Microprocessor 36 counts or times the duration of this period and thus digitizes the analog signal from the phototransistor 28. Algorithms within the microprocessor 36 then perform calculations to implement the functions shown in sensor controlled lighting system 65 in FIG. 5. Microprocessor 36 controls emission of light from a light emitting diode (LED) 40 serving as a low current light source by driving switching transistor 39 on and off or to an intermediate conduction state. The remaining resistors in the circuit diagram have conventional current limiting functions. Microprocessor 36 may also readily be programmed to implement any timer based shut off function for the LED 40.

In summary a battery operated, sensor controlled light which is simple to install within a cabinet and which is insensitive to mounting location is provided by the systems described here. False triggers occurring in response to changes in room lighting are minimized. The optical sensor response to opening and closing of a door is accurate. It operates over broad range of room illumination levels and the response can differentiate between a door being opened and a light being turned on as well as differentiating between a door being closed and a light being turned off and respond accordingly. The system operates with minimal delay in response to opening of a cabinet door.

What is claimed is:

1. An optical sensor controlled lighting system comprising:
    an ambient light sensor responsive to ambient light levels for generating an output signal which is proportional to the ambient light level;
    a light source having a plurality of operational states;
    means responsive to the output signal for developing a rate of change signal;
    means for switching the light source between the plurality of operational states, the means for switching including gain or filtering stages and being responsive to the rate of change signal occurring between unidirectional minimum and maximum rates for switching the light source from one to another of the plurality of operational states and the means for switching being further responsive to the rate of change signal indicating increasing ambient light levels for switching the operational state of the light source to an on state;
    the means for developing being responsive to an increase in the level of the output signal through a threshold level; and
    an average value filter connected to receive a signal proportional to the output signal as an input; and
    at least a first comparator connected to receive the output of the average value filter and the signal proportional to the output signal as inputs to generate a difference signal.

2. The optical sensor controlled lighting system of claim 1, further comprising:
    a source of at least a first dynamic threshold signal for at least the first comparator.

3. An optical sensor controlled lighting system comprising:
    an ambient light sensor responsive to ambient light levels for generating an output signal which is proportional to the ambient light level;
    a light source having a plurality of operational states;
    means responsive to the output signal for developing a rate of change signal;
    means for switching the light source between the plurality of operational states, the means for switching including gain or filtering stages and being responsive to the rate of change signal occurring between unidirectional minimum and maximum rates for switching the light source from one to another of the plurality of operational states and the means for switching being further responsive to the rate of change signal indicating increasing ambient light levels for switching the operational state of the light source to an on state;
    the means for developing including first and second parallel amplifiers of differing gains with the light sensor being connected to supply its output signal as an input to the first and second parallel amplifiers; and
    the means for developing providing for comparing outputs from the first and second amplifiers to a threshold level and determining the time difference between each output crossing the threshold level.

4. An optical sensor controlled lighting system comprising:
    an ambient light sensor responsive to ambient light levels for generating an output signal which is proportional to the ambient light level;
    a light source having a plurality of operational states;
    means responsive to the output signal for developing a rate of change signal;
    means for switching the light source between the plurality of operational states, the means for switching including gain or filtering stages and being responsive to the rate of change signal occurring between unidirectional minimum and maximum rates for switching the light source from one to another of the plurality of operational states and the means for switching being further responsive to the rate of change signal indicating increasing ambient light levels for switching the operational state of the light source to an on state;
    the means for switching being further responsive to the determined rate of change coinciding with decreasing ambient light levels for switching the operational state of the light source to an off state;
    the means for switching including means for analyzing the waveform shape of the output signal from the light sensor.

5. The optical sensor controlled lighting system of claim 4, further comprising:
    the light sensor including a phototransistor connected in series between a voltage source and chassis ground with a resistor connecting the phototransistor to the voltage source and a plurality of series connected transistors connecting the phototransistor to ground, the phototransistor sourcing current in proportion to the intensity of ambient light falling on the phototransistor;
    an emitter follower arrangement including first and second transistors having an input connected to a juncture between the phototransistor and the plurality of series connected transistors;
    a emitter follower resistor connected between the emitter follower arrangement and ground to produce a voltage drop across an output from the emitter follower arrangement which varies with the log of current sourced by the phototransistor and is amplified;
    a capacitor connecting the collector of the second transistor of the emitter follower arrangement to the voltage source so that current in the emitter follower resistor produces a negative voltage ramp across the capacitor;
    a shorting transistor connected across the capacitor;
    a Schmitt trigger inverter connected to the capacitor for application of the negative voltage ramp, the Schmitt trigger inverter generating an output signal when the negative voltage ramp falls below the logic threshold of Schmitt trigger inverter; and
    a microprocessor connected to receive the output signal of the Schmitt trigger inverter, the microprocessor responding to the output signal of the Schmitt trigger inverter for controlling the shorting transistor an output from the microprocessor connected to drive the shorting transistor to restart the negative voltage ramp so that the output signal from the Schmitt trigger inverter has a period which is proportional in duration to the log of the current in phototransistor.

6. The optical sensor controlled lighting system of claim 5, further comprising:

the microprocessor determining from the output signal of the Schmitt trigger inverter the rate of change of the ambient light level and crossovers of ambient illumination levels.

7. An optical sensor controlled lighting system comprising:

an ambient light sensor responsive to ambient light levels for generating an output signal which is proportional to the ambient light level;

a light source having a plurality of operational states;

means responsive to the output signal for developing a rate of change signal;

means for switching the light source between the plurality of operational states, the means for switching including gain or filtering stages and being responsive to the rate of change signal occurring between unidirectional minimum and maximum rates for switching the light source from one to another of the plurality of operational states;

the means for switching being further responsive to the determined rate of change coinciding with decreasing ambient light levels for switching the operational state of the light source to an off state;

the means for developing being responsive to a decrease in the level of the output signal through a threshold level;

an average value filter connected to receive a signal proportional to the output signal as an input; and at least a first comparator connected to receive the output of the average value filter and the signal proportional to the output signal as inputs to generate a difference signal.

8. The optical sensor controlled lighting system of claim 7, further comprising:

a source of at least a first dynamic threshold signal for the at least first comparator.

9. An optical sensor controlled lighting system comprising:

an ambient light sensor responsive to ambient light levels for generating an output signal which is proportional to the ambient light level;

a light source having a plurality of operational states;

means responsive to the output signal for developing a rate of change signal;

means for switching the light source between the plurality of operational states, the means for switching including gain or filtering stages and being responsive to the rate of change signal occurring between unidirectional minimum and maximum rates for switching the light source from one to another of the plurality of operational states;

the means for switching being further responsive to the determined rate of change coinciding with decreasing ambient light levels for switching the operational state of the light source to an off state;

the means for developing including first and second parallel amplifiers of differing gains with the light sensor being connected to supply its output signal as an input to the first and second parallel amplifiers; and the means for developing providing for comparing outputs from the first and second amplifiers a threshold level and determining the time difference between each output crossing the threshold level.

10. An optical sensor controlled lighting system comprising:

an ambient light sensor responsive to ambient light levels for generating an output signal which is proportional to the ambient light level;

a light source having a plurality of operational states;

means responsive to the output signal for developing a rate of change signal;

means for switching the light source between the plurality of operational states, the means for switching including gain or filtering stages and being responsive to the rate of change signal occurring between unidirectional minimum and maximum rates for switching the light source from one to another of the plurality of operational states;

the means for switching being further responsive to the determined rate of change coinciding with decreasing ambient light levels for switching the operational state of the light source to an off state; and the means for switching including means for analyzing the waveform shape of the output signal from the light sensor.

11. The optical sensor controlled lighting system of claim 10, further comprising:

the light sensor including a phototransistor connected in series between a voltage source and chassis ground with a resistor connecting the phototransistor to the voltage source and a plurality of series connected transistors connecting the phototransistor to ground, the phototransistor sourcing current in proportion to the intensity of ambient light falling on the phototransistor;

an emitter follower arrangement including first and second transistors having an input connected to a juncture between the phototransistor and the plurality of series connected transistors;

a emitter follower resistor connected between the emitter follower arrangement and ground to produce a voltage drop across an output from the emitter follower arrangement which varies with the log of current sourced by the phototransistor and is amplified;

a capacitor connecting the collector of the second transistor of the emitter follower arrangement to the voltage source so that current in the emitter follower resistor produces a negative voltage ramp across the capacitor;

a shorting transistor connected across the capacitor;

a Schmitt trigger inverter connected to the capacitor for application of the negative voltage ramp, the Schmitt trigger inverter generating an output signal when the negative voltage ramp falls below the logic threshold of Schmitt trigger inverter; and a microprocessor connected to receive the output signal of the Schmitt trigger inverter, the microprocessor responding to the output signal of the Schmitt trigger inverter for controlling the shorting transistor an output from the microprocessor connected to drive the shorting transistor to restart the negative voltage ramp so that the output signal from the Schmitt trigger inverter has a period which is proportional in duration to the log of the current in phototransistor.

12. The optical sensor controlled lighting system of claim 11, further comprising:

the microprocessor determining from the output signal of the Schmitt trigger inverter the rate of change of the ambient light level and crossovers of ambient illumination levels.

13. An optical sensor controlled lighting system comprising:

an ambient light sensor responsive to ambient light levels for generating an output signal which is proportional to the ambient light level;

a light source having a plurality of operational states;

means responsive to the output signal for developing a rate of change signal;

means for switching the light source between the plurality of operational states, the means for switching including gain or filtering stages and being responsive to the rate of change signal occurring between unidirectional minimum and maximum rates for switching the light source from one to another of the plurality of operational states;

the means for switching being further responsive to the determined rate of change coinciding with increasing ambient light levels for switching the operational state of the light source to an on state; and the means for switching including means for analyzing the waveform shape of the output signal from the light sensor.

\* \* \* \* \*